(12) United States Patent
Kmoch et al.

(10) Patent No.: US 7,566,216 B2
(45) Date of Patent: Jul. 28, 2009

(54) MOLD ASSEMBLY USING INSERTS

(75) Inventors: Sven Kmoch, Platten (DE); Ralf Walter Fisch, Saarburg (DE); Derek Robertson McCready, Mississauga (CA); Joachim Johannes Niewels, Thornton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 124 days.

(21) Appl. No.: 11/741,761

(22) Filed: Apr. 29, 2007

(65) Prior Publication Data

US 2008/0268089 A1    Oct. 30, 2008

(51) Int. Cl.
*B29C 45/23* (2006.01)
(52) U.S. Cl. .................. 425/549; 425/563; 425/564; 425/572
(58) Field of Classification Search .................. 425/549, 425/563, 564, 572
See application file for complete search history.

(56) References Cited

U.S. PATENT DOCUMENTS

| | | | |
|---|---|---|---|
| 4,307,866 A | 12/1981 | Brown | |
| 5,736,173 A | 4/1998 | Wright et al. | |
| 6,220,850 B1 | 4/2001 | Catoen et al. | |
| 6,398,542 B1 | 6/2002 | Romanski | |
| 6,569,370 B1 | 5/2003 | Amin et al. | |
| 7,104,782 B2 | 9/2006 | Elliott | |
| 2005/0236725 A1 | 10/2005 | Niewels et al. | |
| 2006/0099295 A1 | 5/2006 | Elliott | |
| 2007/0092596 A1 | 4/2007 | Li | |

FOREIGN PATENT DOCUMENTS

| | | |
|---|---|---|
| CA | 2449179 A1 | 1/2003 |
| CA | 2492701 A1 | 2/2004 |

*Primary Examiner*—Tim Heitbrink

(57) ABSTRACT

An injection molding machine is provided, including a nozzle assembly having a channel for conveying a fluid. At least one cavity insert is removably mounted within a cavity plate, the at least one cavity insert defining a mold cavity, and a first portion of a gate for communicating the fluid between the nozzle assembly and the mold cavity. A gate insert defines a receptacle for the nozzle assembly, and further defining a second portion of the gate. The gate insert is floatably retained between the nozzle assembly and the at least one cavity insert. Preferably, the gate insert is retained by a gate insert plate that is disposed between the cavity plate and the nozzle assembly.

10 Claims, 10 Drawing Sheets

MOLD ASSEMBLY USING INSERTS

FIELD OF THE INVENTION

The present invention relates, generally, to injection molding systems. More particularly, the invention relates to the interface between inserts in a molding assembly.

BACKGROUND OF THE INVENTION

Injection molding is a commonly employed manufacturing technique for forming articles. An example of an article that is typically formed using injection molding is a plastic preform. A plastic preform can then be subsequently blow-molded into a plastic bottle.

An injection mold for making preforms (and other molded articles) typically includes one or more molding cavities for receiving molten resin and forming the preforms. To increase the flexibility of the molding assembly, interchangeable inserts can be inserted into bores in a cavity plate. FIG. 1 shows a portion of a prior art injection molding machine 10. One or more mold cavities 12 are usually defined between complementary shaped, generally cylindrical cavity inserts 14 and core inserts 15 that are arranged within bores in a cavity plate 16. The mold cavities 12 are aligned generally parallel to the direction of mold-clamping action (i.e., the mold-clamping axis).

For mold articles that have threaded neck portions, a split neck ring (not shown) cooperates with the core insert 15 to create the neck. A taper is typically provided at an end of the cavity insert 14 (also not shown) to help align the neck ring.

A hot runner assembly 18 communicates a flow of molten resin to melt channels 19 in one or more nozzle assemblies 20. A gate insert 22 is seated within the mold cavity inserts 14. A first profiled surface 24 on gate insert 22 defines a receptacle to house the tip of the nozzle assembly 20. A second profiled surface 26 on the gate insert 22 defines a portion of the mold cavity 12. A gate 28 is provided in gate insert 22 which provides fluid communication between the nozzle assemblies 20 and each of the mold cavities 12. Gate 28 is open or closed by a piston valve 29. Other types of gating, such as slide valves or thermal gating can also be used The molten resin that is injected into the cavities must be cooled to solidify the resin so that the molded preform can be removed from the mold. It is desirable to cool the preform as quickly as possible so the preforms can be removed and a next injection cycle initiated with minimal time delay. To this effect, cooling channels 30 are typically provided in the cavity and gate inserts 14 and 22. A cooling fluid, such as water, is circulated through the cooling channels 30.

The use of mold cavity inserts 14 and gate inserts 22 increases the machine's flexibility, as the inserts can be switched to produce a different molded object without the need to remove the cavity plate 16 from the molding assembly 10. However, before the cavity inserts 14 and gate inserts 22 can be safely removed, the nozzle assemblies 20, which may contain still-hot molten resin, must be allowed to cool.

Efforts have been made to improve mold assemblies. U.S. Pat. No. 6,398,542 to Romanski et al. teaches a valve gating apparatus for injection molding including at least one shutter disposed between the gate and the cavity melt channel into a mold cavity. The shutter is removably fastened to a rail member. When the rail member is moved laterally, the shutter moves between a closed position wherein flow of melt from the nozzle into the cavity is inhibited, and an open position wherein flow of melt into the cavity is unimpeded by the shutter. In a preferred embodiment, a sliding gate valve with inserts that includes a hot runner insert around the injection nozzle and a gate insert which defines a portion of the mold cavity. The gate between the injection nozzle and the mold cavity is defined and split between the hot runner insert and the gate insert. The hot runner insert is retained by the manifold plate of the hot runner assembly, and the gate insert is retained by the cavity plate.

U.S. patent application 2006/0099295 to Elliot teaches a gate insert for a stack assembly in an injection molding machine having a gate through which a melt of thermoplastics material enters a mold cavity. The gate insert has a cooling channel surrounding, and substantially uniformly spaced from, the gate. The cooling channel has an inner surface with a profile substantially parallel to the gate. The cooling channel is further defined by a two-piece gate insert having interconnecting surfaces.

U.S. patent application 2005/0236725 to Niewels et al. teaches a method and apparatus for controlling an injection mold having a first surface and a second surface includes an active material element configured to be disposed between the first surface and a second surface. The active material element may be configured to sense a force between the first surface and the second surface, and to generate corresponding sense signals. Transmission structure is coupled to the active material element and is configured to carry the sense signals. Preferably, an active material element actuator is also disposed between the first surface and a second surface, and is configured to provide an expansive force between the first surface and a second surface in accordance with the sense signals. The method and apparatus may be used to counter undesired deflection and/or misalignment in an injection mold. The active material actuator is operable to "tilt" a core element when misalignment occurs.

U.S. Pat. No. 5,736,173 to Wright et al. teaches a preform injection mould includes an elongate mould core cooperating with a female mould and a neck ring in a manner to define a mould cavity therebetween. An injection nozzle in the female mould allows molten plastic to be injected into the mould cavity so that a preform molded article may be formed. The neck ring is constituted by a pair of mating halves which can be separated laterally with respect to the longitudinal axis of the mould core. A taper sleeve surrounds the mould core beneath the neck ring. The neck ring halves are secured to diametrically opposed slides to facilitate lateral separation of the neck ring. A pair of slide taper locks contact a respective one of the slides to inhibit lateral movement of the slides and to back up the neck ring when injection mould is in a mould closed position. An annular formation is formed on the upper surface of the neck ring and is accommodated by a complementary recess formed in the bottom of the female mould. The mating inclined surfaces of the female mould and the annular formation constitute an upper taper lock which is backed up by a cavity plate. An annular formation is provided on the upper surface of the taper sleeve and is accommodated by a complimentary recess formed in the bottom of the neck ring. The mating inclined surfaces of the taper sleeve and neck ring constitute a lower taper lock. Since a portion of the neck ring constitutes the female taper of the lower taper lock, the lower taper lock is backed up by the slide taper locks through the slides allowing the cross-sectional area of the neck ring to be reduced.

U.S. Pat. No. 6,569,370 to Amin et al. teaches an injection molding system for molding a molded article and method for forming same, including a mold cavity for forming the molded article, wherein the mold cavity is defined at least in part by a mold core defining inner walls of the molded article, a first insert defining at least outer side walls of the molded article, and a second insert defining an outer wall of a neck of the molded article. In addition, a cavity plate at least partly surrounds the first insert and a cavity flange retains the first insert in the cavity plate.

SUMMARY OF THE INVENTION

According to a first broad aspect of the invention, there is provided an injection molding machine, including a nozzle assembly having a channel for conveying a fluid. At least one cavity insert is removably mounted within a cavity plate, the at least one cavity insert defining a mold cavity, and a first portion of a gate for communicating the fluid between the nozzle assembly and the mold cavity. A gate insert defines a receptacle for the nozzle assembly, and further defining a second portion of the gate. The gate insert is floatably retained between the nozzle assembly and the at least one cavity insert.

According to a second broad aspect of the invention, there is provided a mold assembly for an injection molding machine having a stationary portion and a moving portion, and a nozzle assembly for conveying a fluid. A mold cavity is defined by at least one cavity insert on the stationary portion. A mold core is defined on the moving portion. A gate insert is floatably retained on the stationary portion between the at least one cavity insert and the nozzle assembly and providing a receptacle for the nozzle assembly. A first portion of a gate for communicating the fluid between the nozzle assembly and the mold cavity is defined within the gate insert and a second portion of the gate is defined within the at least one cavity insert.

According to a third broad aspect of the invention, there is provided a gate insert plate for an injection molding machine having a nozzle assembly and a mold cavity. The gate insert plate is located between the nozzle assembly and the mold cavity. The gate insert plate includes a bore for coaxially seating a gate insert which defines a gate for fluid communication between the nozzle assembly of the injection molding machine and the mold cavity.

According to a fourth broad aspect of the invention, there is provided a gate for fluid communication between a nozzle assembly of an injection molding machine and at least one cavity insert defining a mold cavity. The gate has a first portion defined by a gate insert that is floatably retained between the nozzle assembly and the at least one cavity insert and a second portion defined by the at least one cavity insert.

According to a fifth broad aspect of the invention, there is provided a gate insert defining a receptacle for a nozzle assembly of an injection molding machine and further defining a portion of a gate for fluid communication between the nozzle assembly of the injection molding machine and a mold cavity. The gate insert is retained by a gate insert plate that is disposed between the mold cavity and the nozzle assembly.

According to a sixth broad aspect of the invention, there is provided an injection molding machine. The injection molding machine includes a nozzle assembly having a channel for conveying a fluid. At least one cavity insert is removably mounted within a cavity plate, the at least one cavity insert defining a mold cavity and a first portion of a gate for communicating the fluid between the nozzle assembly and the mold cavity. A gate insert defines a receptacle for the nozzle assembly, and further defining a second portion of the gate. The gate insert is retained by a gate insert plate that is disposed between the cavity plate and the nozzle assembly.

According to a seventh broad aspect of the invention, there is provided a mold assembly for an injection molding machine having a stationary portion and a moving portion, and a nozzle assembly for conveying a fluid. The mold assembly includes a mold cavity being defined by at least one cavity insert on the stationary portion, and a mold core being defined on the moving portion. A gate insert is retained on the stationary portion by a gate insert plate between the at least one cavity insert and the nozzle assembly and providing a receptacle for the nozzle assembly. A first portion of a gate for communicating the fluid between the nozzle assembly and the mold cavity is defined within the gate insert and a second portion of the gate is defined within the at least one cavity insert.

DETAILED DESCRIPTION OF DRAWINGS

Objects and advantages of the present invention will become apparent to those skilled in the art upon reading the following detailed description of non-limiting embodiments of the present invention, in conjunction with the accompanying drawings, wherein like reference numerals have been used to designate like elements, and wherein.

DETAILED DESCRIPTION OF THE EMBODIMENTS

Figure 1:
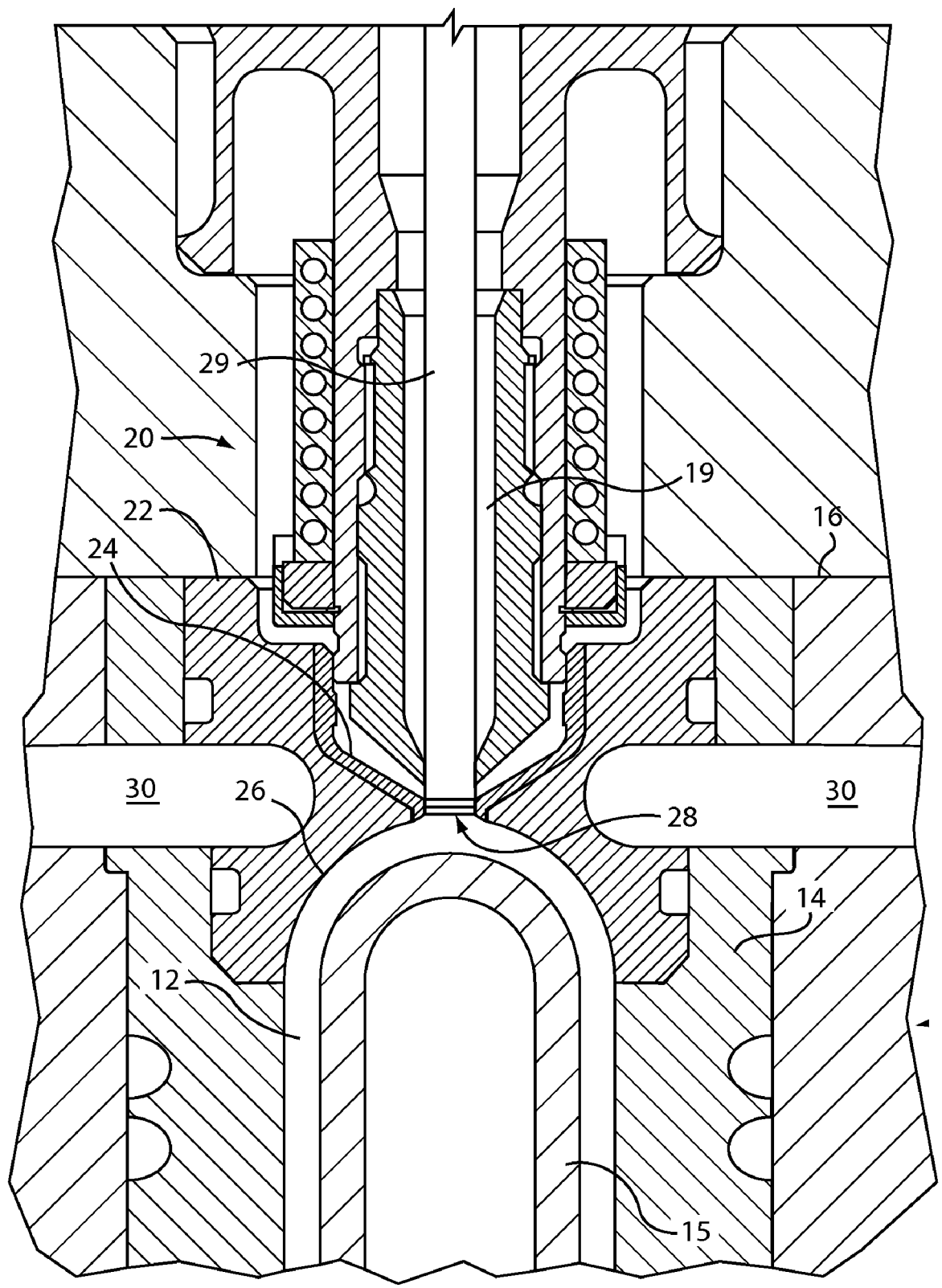
FIG. 1 shows a cross section view of a stationary portion of a prior art injection molding machine.
Figure 2:
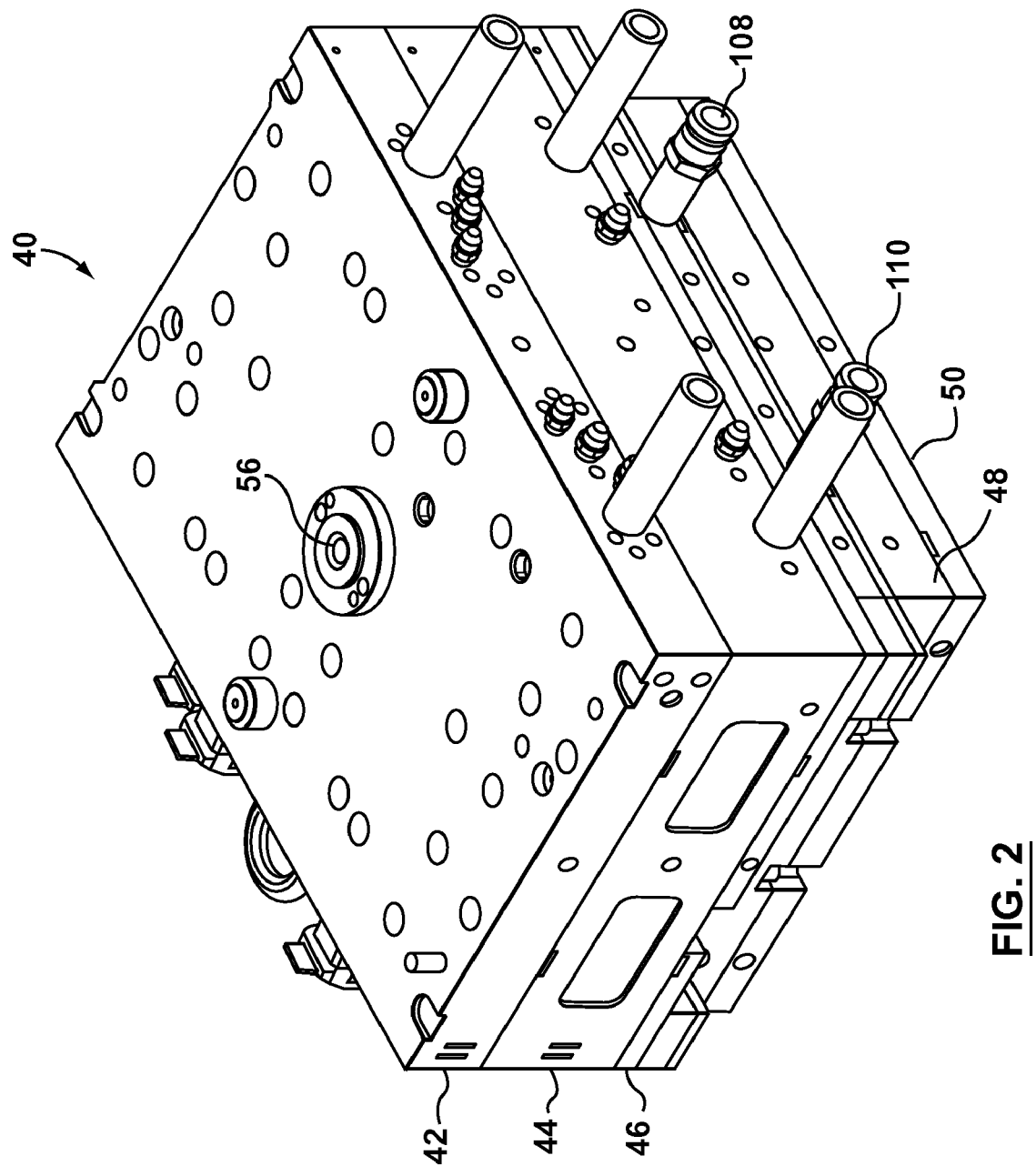
FIG. 2 shows a perspective view of a stationary portion of an injection molding machine in accordance with a first non-limiting embodiment of the invention.
Figure 3:
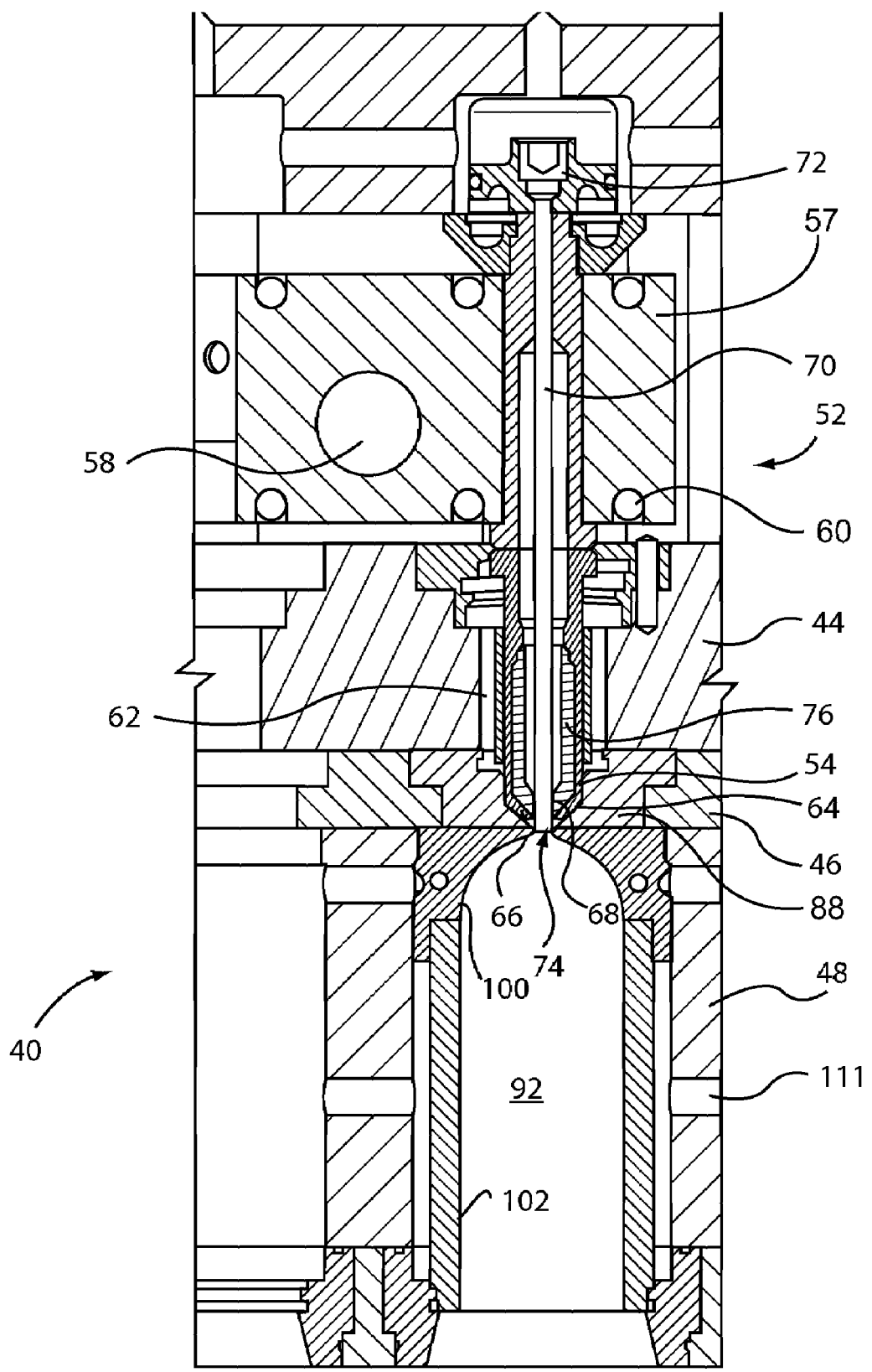
FIG. 3 shows a first cross section view of the stationary portion shown in FIG. 2.
Figure 4:
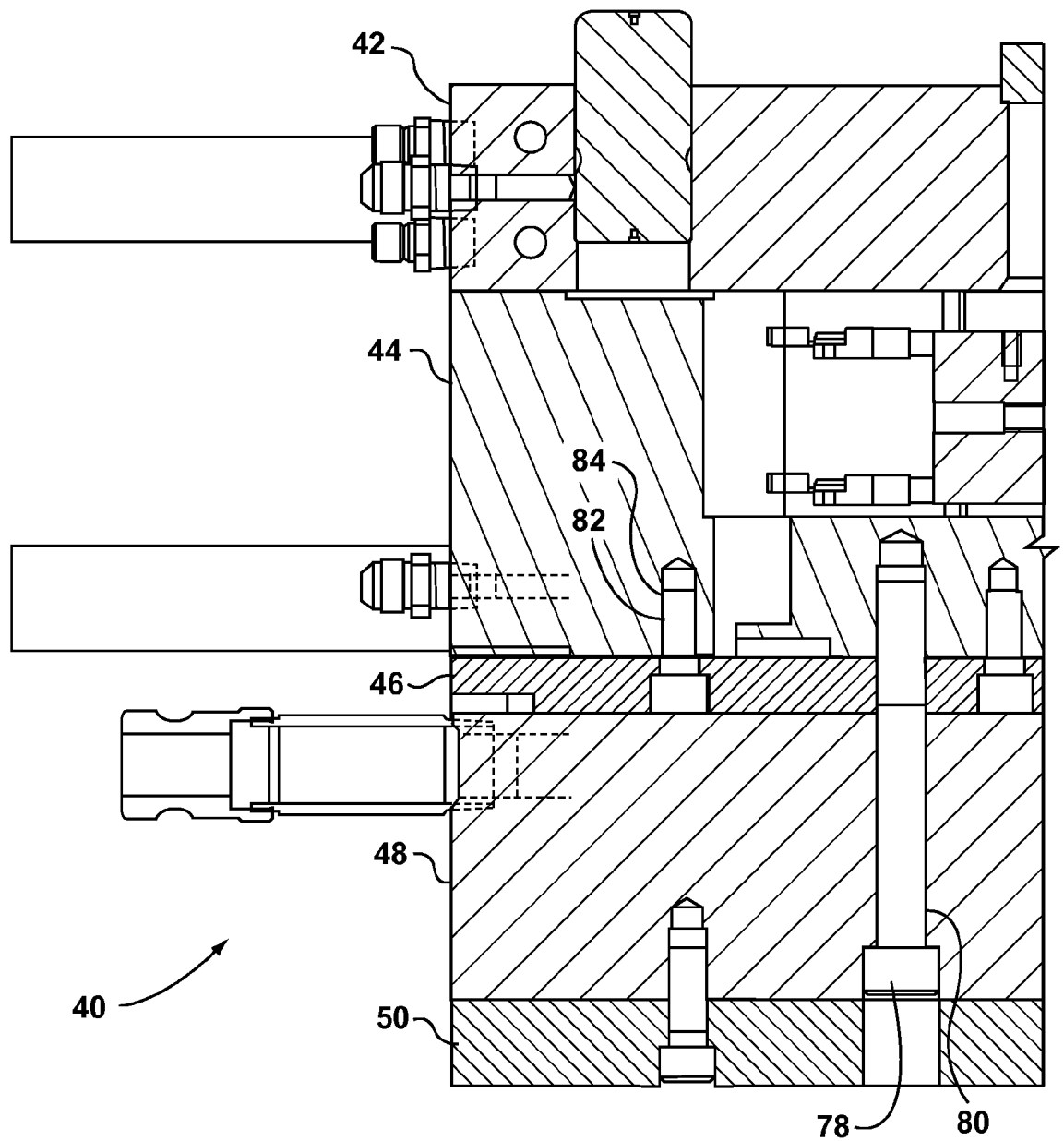
FIG. 4 shows a second cross section view of the stationary portion shown in FIG. 2.

Referring to FIGS. 2-4, a stationary portion of a multi-cavity injection molding machine in accordance with a first non-limiting embodiment of the invention is shown generally at 40. The stationary portion 40 includes a manifold backing plate 42, a manifold plate 44, a gate insert plate 46, a cavity plate 48 and a taper insert plate 50.

A hot runner system 52 is provided within stationary portion 40 which provides a fluid, typically molten resin to one or more nozzle assemblies 54 that are distributed across the system. The implementation of the nozzle assemblies 54 is not particularly limited and can include both thermal gated and valve gated nozzle assemblies. It is contemplated that the present invention is particularly suited to, but not necessarily limited to, injection molding machines that produce polyethylene teraphthalate (PET) preforms. The molten resin is supplied to hot runner system 52 from a resin source, typically a hopper feeding resin pellets to a plasticizer (not shown) and thence to a main melt channel 56. Main melt channel 56 conveys the now molten resin to the manifold 57. As is well known, the manifold 57 has a number of manifold melt channels 58 through which the molten resin travels to nozzle assemblies 54 while it is maintained at an optimum processing temperature by manifold heaters 60.

Each of the nozzle assemblies 54 is coaxially located within a bore 62 provided in the manifold plate 44, sandwiched between manifold backing plate 42 and the gate insert plate 46. Each of the nozzle assemblies 54 generally includes a generally conical nozzle sheath 64 in which is held a nozzle tip 66 through which runs a nozzle channel 68 that is in communication with one of the manifold melt channels 58. In the presently illustrated embodiment, nozzle assemblies 54 are valve gated. A valve stem 70 is operable to be reciprocated by a piston 72 between an opened and a closed position. In the open position, resin exits each of the nozzle assemblies 54 through nozzle tip 66 and out through a gate 74 (best seen in FIG. 6 and described in greater detail below). In the closed position (as shown in FIG. 3), valve stem 70 closes off gate 74, preventing the resin from exiting through the nozzle tip 66. A nozzle heater 76 maintains nozzle tip 66 at a relatively high temperature, determined by the molten resin being injected. However, the invention is not particularly limited to nozzle assemblies 54 that use valve gates, and other types of nozzle assemblies are within the scope of the invention.

Manifold plate 44, gate insert plate 46 and cavity plate 48 are mounted and aligned together in stationary portion 40 via fasteners 78 which extend through coaxial apertures 80 in each of the three plates. Gate insert plate 46 is also directly mounted to manifold plate 44 via fasteners 82 which extend through coaxial apertures 84 in the two plates. It will thus be apparent that cavity plate 48 can be removed from stationary portion 40 without removing gate insert plate 46 from the manifold plate 44.

Figure 5:
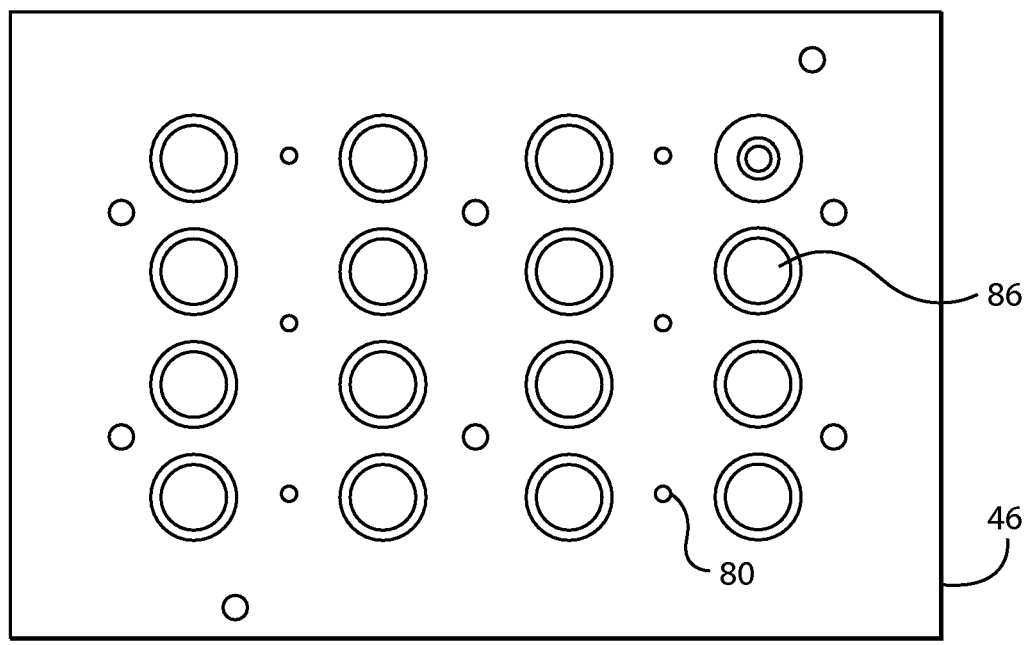
FIG. 5 shows a front plan view of a gate insert plate for the stationary portion shown in FIG. 2.
Figure 6:
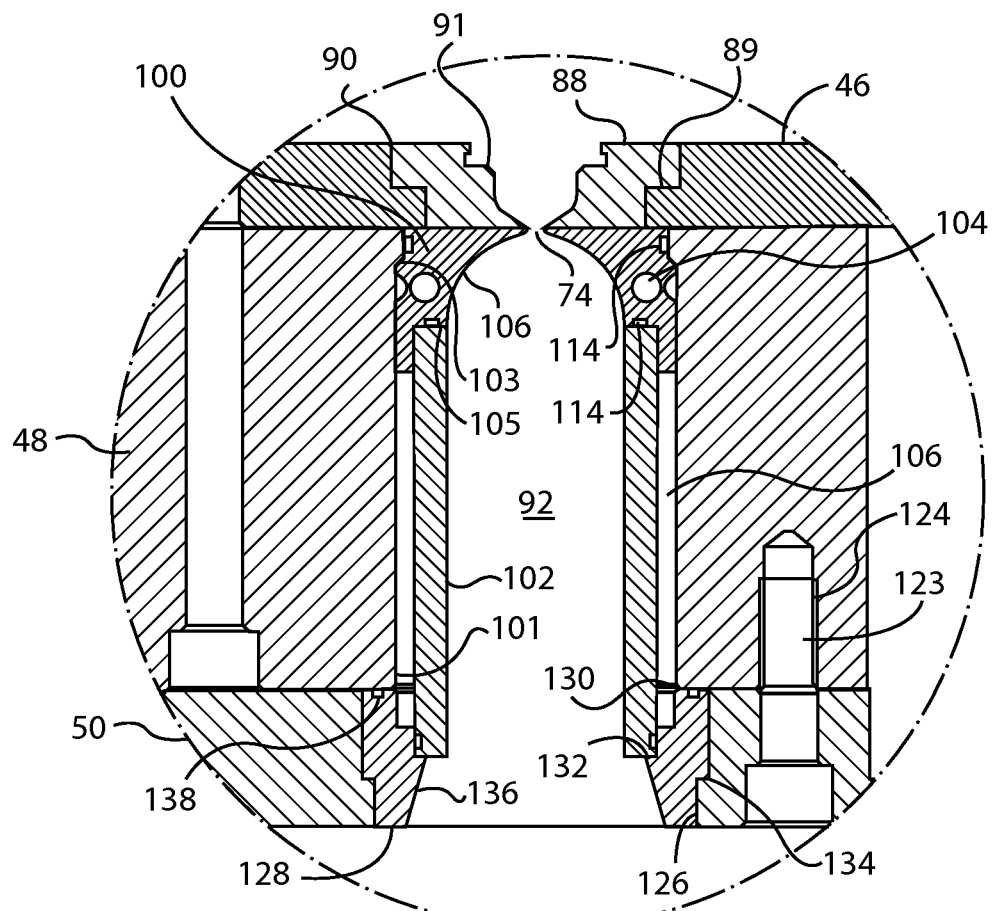
FIG. 6 shows a cross section view of a cavity insert plate for the stationary portion shown in FIG. 2.

Referring now to FIGS. 5 and 6, in addition to FIG. 3, distributed across gate insert plate 46 are a plurality of gate bores 86 that are coaxially aligned with nozzle assemblies 54 (and thus generally aligned with the axis of mold clamping). Each of the gate bores 86 is adapted to receive a gate insert 88. Each of the gate bores 86 narrows to provide a gate land 89 which supports a flange 90 on the gate insert 88 in order to retain the gate insert in a "floating" fit so that the gate insert 88 can slide along a plane generally traverse to the mold-clamping axis. When properly seated in its respective gate bore 86, the gate insert 88 is recessed fully within the plane of the gate insert plate 46. A profiled surface 91 within gate insert 88 defines a receptacle for the nozzle sheath 64. The profiled surface 91 is complementary to nozzle sheath 64, thereby substantially and coaxially aligning each of the nozzle assemblies 54 with their respective gate insert 88. As is known to those of skill in the art, a gate insert 88 can be replaced by the repeated wear and tear of opening and closing of gate 74. If desired, profiled surface 91 can be lined with an insulating material to reduce unwanted heat transference from the nozzle assemblies 54 to gate insert plate 46.

A first portion of the gate 74 is defined with gate insert 88, extending from the tip of profiled surface 91 in gate insert 88 towards a mold cavity 92 located within cavity plate 48. Gate 74 is in communication with both the nozzle channel 68 and mold cavity 92, thereby permitting the flow of molten resin from the first to the latter. Since the gate insert 88 is retained by the gate insert plate 46, the gate insert 88 covers the nozzle assembly 54 even when the cavity plate 48 is removed.

The mold cavity 92, which defines an exterior surface of a molded object such as a preform (not shown), is generally defined by at least one cavity insert, and specifically in the currently illustrated embodiment by a first cavity insert 100 and a second cavity insert 102. Each first cavity insert 100 is retained within a cavity bore 101 in cavity plate 48. An insert land portion 103 of cavity bore 101 prevents first cavity insert 100 from exiting out of the cavity plate 48 in a non-preferred direction. Second cavity insert 102 is coaxial with the first cavity insert 100 and seated on an insert land 105 on first cavity insert 100. It will be apparent from the figures that a first portion of gate 74 is defined by gate insert 88 and that a second portion of gate 74 is defined by first cavity insert 100. Gate insert 88 and first cavity insert 100 float relative to one another on an axis generally traverse to the mold clamping axis, providing a sliding, or "floating" interface between the two halves of gate 74.

Cooling channels 104 are typically provided in first cavity insert 100 to cool the resin injected into the mold cavity 92. In addition, a cooling channel 106 is defined in a gap between the second cavity insert 102 and cavity plate 48. Cooling channel 106 is operable to receive a cooling mold cavity insert (not shown), as is described in pending U.S. application Ser. No. 11/254,325, entitled "Molding Insert with a Cooling Channel Insert", and filed on Oct. 20, 2005. A cooling fluid, such as water is circulated through the cooling channels 104 and 106 (via the mold cavity insert) during a cooling phase of an injection cycle, as will be further described below. Referring in addition to FIG. 2, the cooling fluid enters the cavity plate 48 through inlet 108 and is routed to cooling channels 104 and 106 via transport channels 111 (FIG. 3) in the cavity plate 48. After completing its circuit, the cooling fluid exits cavity insert plate the through outlet 112. Seal niches 114 are provided to locate rubberized seals and prevent leakage between first cavity inserts 100 and second cavity inserts 102.

Figure 7:
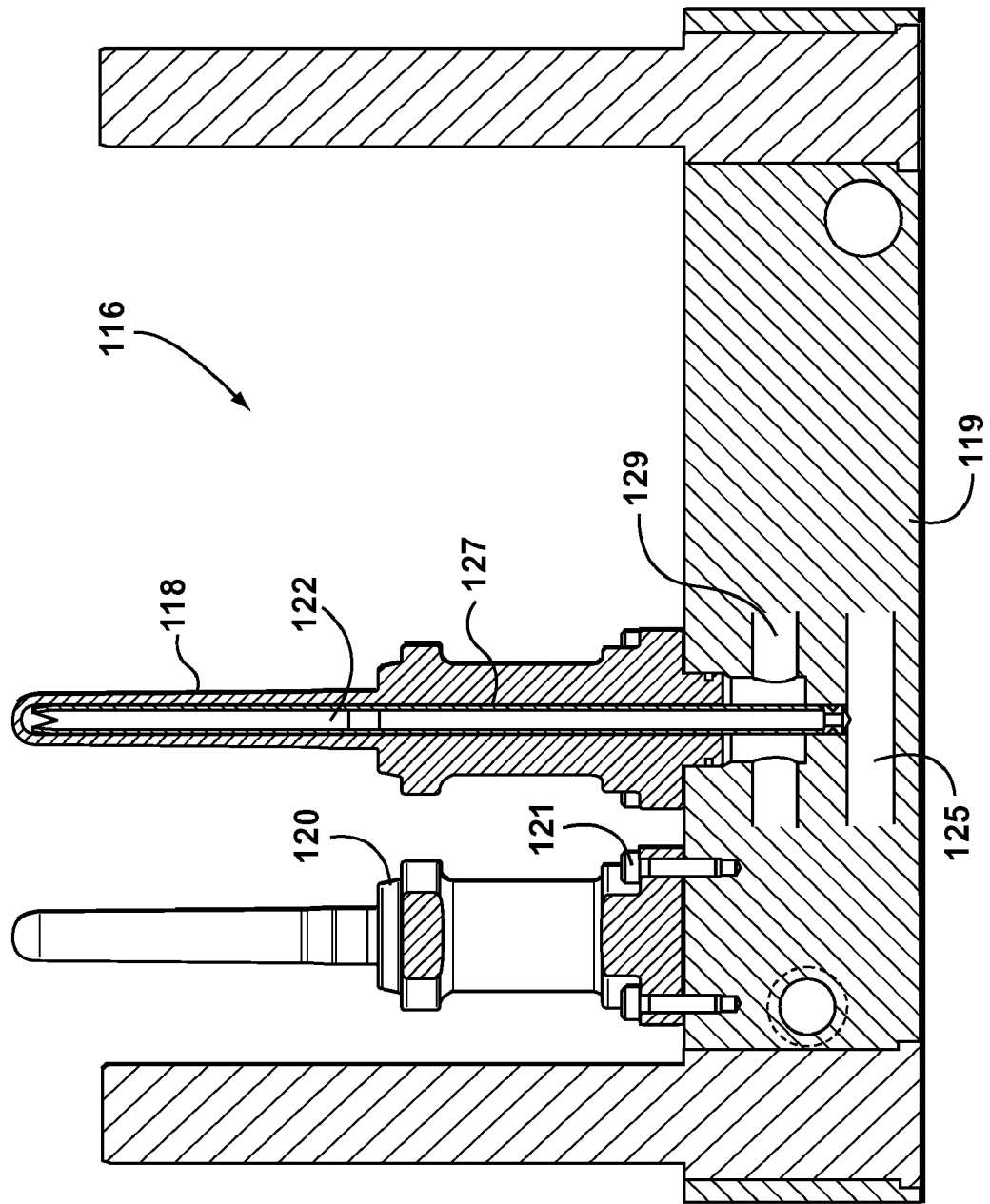
FIG. 7 shows a cross section view of a portion of a core insert plate for a moving portion of a hot runner assembly.

Referring now to FIG. 7, a portion of a moving portion 116 for an injection molding machine is shown. A core member 118 is mounted to a core plate 119 via fasteners 121. Core member 118 cooperates with first cavity insert 100 and second cavity insert 102 to define the mold cavity 92. Core member 118 defines a mold core, shaping the inner surface of the preform. A core taper 120 is provided on core member 118 to help align core member 118 with mold cavity 92 during closure of the two mold halves. Core member 118 includes a cooling tube 122 to cool the interior surface of the preform. A cooling fluid, such as water is circulated through the cooling tube 122 during a cooling phase of an injection cycle, as will be further described below. The cooling fluid is routed to cooling tube 122 via transport channels 125 in the core plate 119. The cooling water then runs down the annular tube 127 and is subsequently removed from core plate 119 out through return channel 129.

Figure 8:
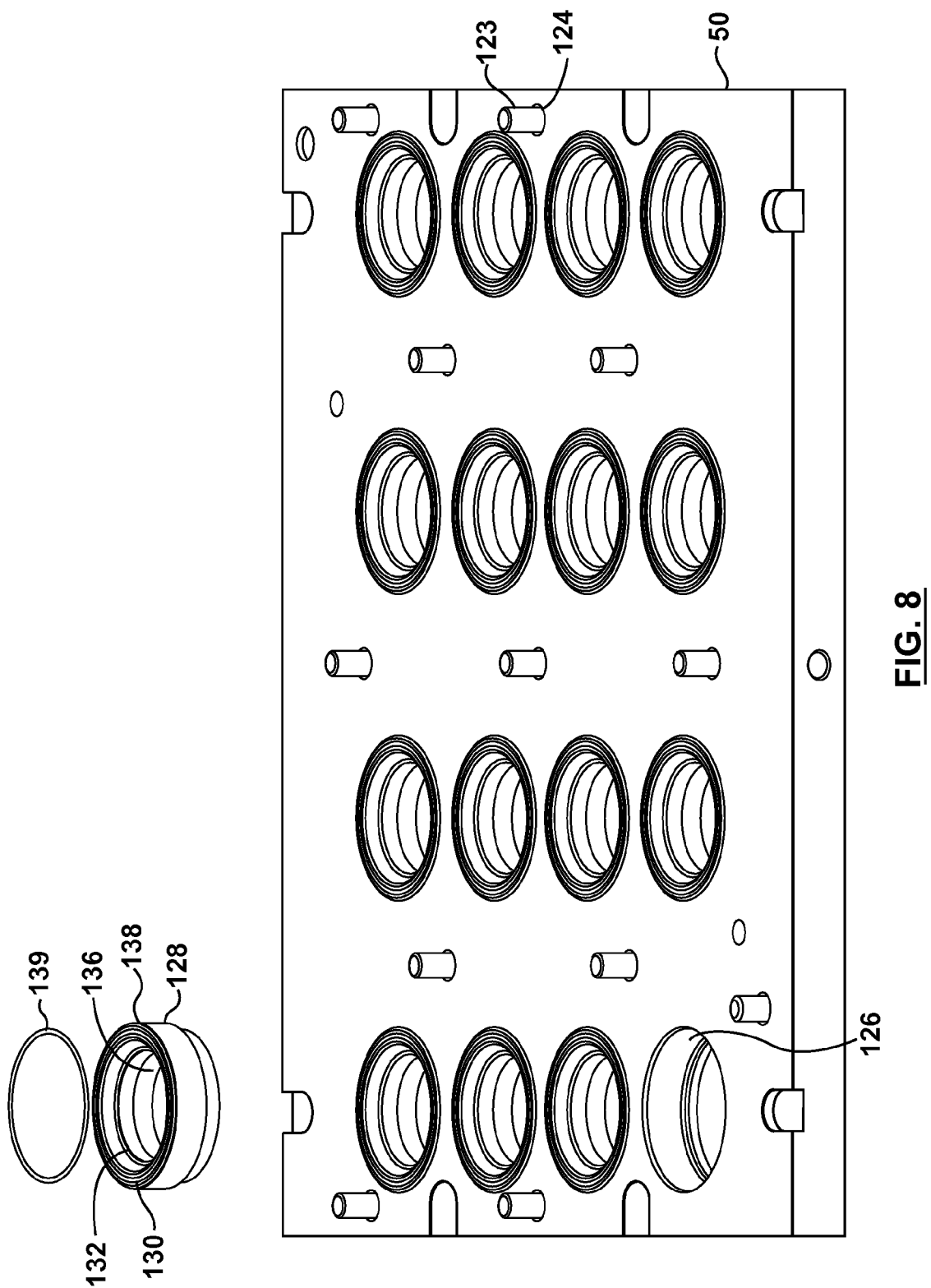
FIG. 8 shows a perspective view of a taper insert plate for the stationary portion shown in FIG. 2.

Referring back to FIG. 6, and additionally to FIG. 8, taper insert plate 50 insert is mounted to cavity plate 48 via fasteners 123 which extend through coaxial apertures 124 in both of the plates. Distributed across taper insert plate 50 are a plurality of taper insert bores 126 that are coaxially aligned with the mold axis defined by nozzle assemblies 54. Each of the taper insert bores 126 is adapted to receive a taper insert 128. Taper insert 128 retains the second cavity insert 102 within its cavity bore 101, and is in turn, retained by taper insert plate 50. Each taper insert 128 includes a cavity plate land 130 which abuts against cavity plate 48, a cavity insert land 132 which abuts against the second cavity insert 102, and a taper plate land 134 which abuts against taper insert plate 50, thereby retaining the taper insert 128 in a floating fit between taper insert plate 50 and second cavity insert 102. In addition, first cavity insert 100 and second cavity insert 102 now float between gate insert 88 and taper insert 128 along an axis generally traverse to the mold-clamping axis.

When properly seated in its respective taper insert bore 126, the taper insert 128 is recessed fully within the plane of the taper insert plate 50. Taper insert 128 further includes a tapered surface 136 which helps locate a neck ring (not shown) during the insertion of the core member 118 into the mold cavity 92 during the injection cycle. A seal niche 138 is provided to locate a rubberized seal 139 and prevent leakage between taper insert 128 and cavity plate 48.

Figure 9:
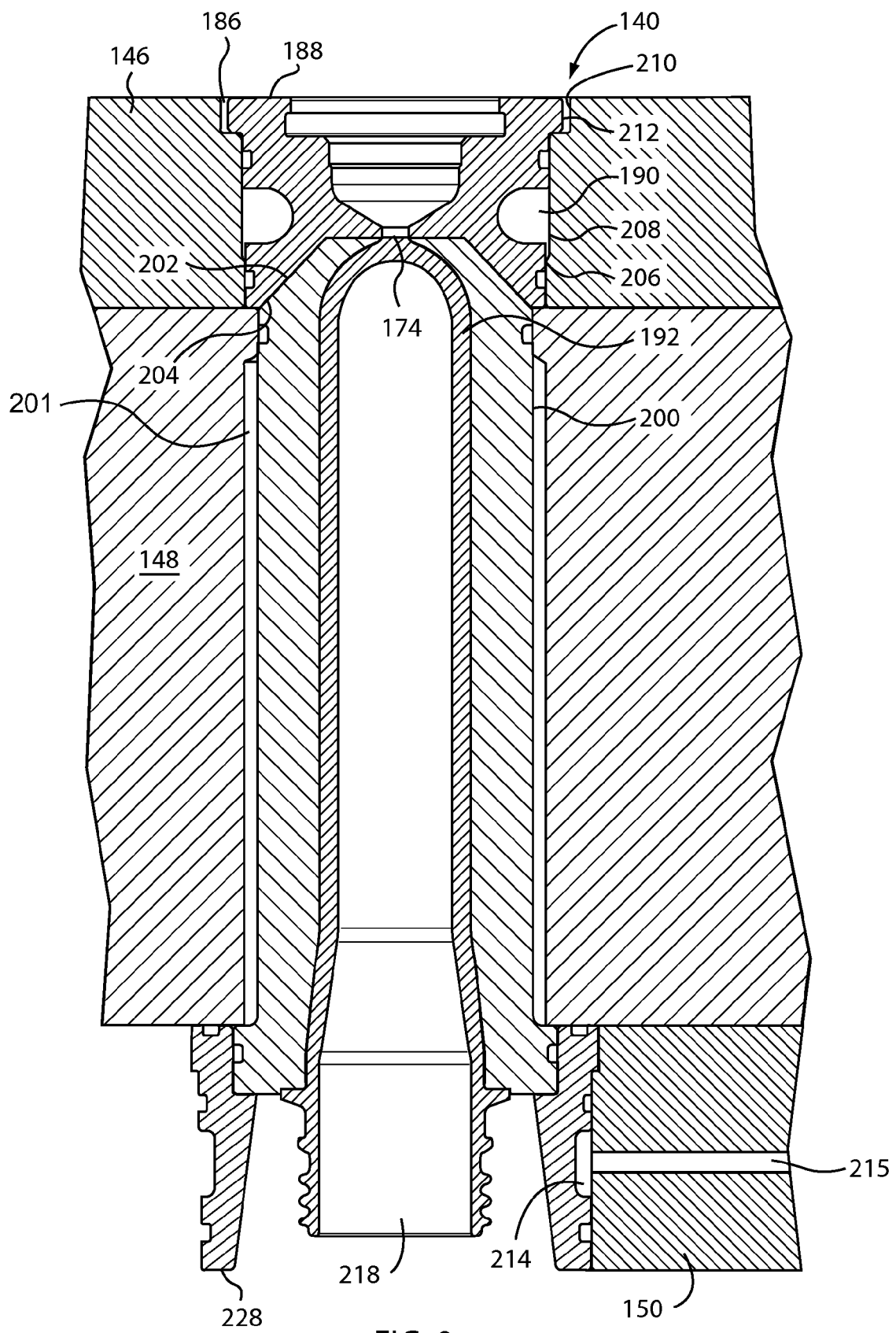
FIG. 9 shows a cross section view of a cavity insert plate for the stationary portion shown in FIG. 2, in accordance with a second non-limiting embodiment of the invention.

Referring now to FIG. 9, a stationary portion of a multi-cavity injection molding machine in accordance with a second non-limiting embodiment of the invention is shown generally at 140. Stationary portion 140 includes a gate insert plate 146, a cavity plate 148, and a taper insert plate 150. A gate insert 188 is seated within a gate bore 186 in the gate insert plate 146. A first portion of a gate 174 is defined within gate insert 188. A cooling channel 190 is defined within gate insert 188 to reduce heat transference from nozzle assembly 54 (FIG. 3) to a cavity 192, which is defined between a cavity insert 200 and a core member 218 which is mounted to the moving portion (not shown). In the illustrated embodiment, a cooling fluid, such as water, is circulated through the cooling channels 190 during a cooling phase of an injection cycle, as will be further described below. The cooling fluid is routed to cooling channels 190 via transport channels (not shown) in the gate insert plate 146. An additional cooling channel 214 is defined between a taper insert 228 and taper insert plate 150. The cooling fluid is routed to cooling channel 214 via transport channels 215 in the gate taper insert plate 150

The cavity insert 200 is seated within a cavity bore 201 within cavity plate 148. A second portion of gate 174 is defined within cavity insert 200 that is in floating communication with the first portion of gate 174. The exterior surface of the preform is defined by the single cavity insert 200. Gate insert 188 includes a tapered portion 202, and cavity insert 200 include a complementary tapered portion 204, to substantially and coaxially align the two inserts together. The interface between tapered portion 202 and 204 allows cooling channel 190 to be located closer to cavity 192, thereby increasing the cooling efficiency of the cooling channel 190.

Gate insert plate 146 includes tapered side portions 206 along a sidewall 208 of gate bore 186 to reduce the force required for the insertion of gate insert 188 into gate bore 186. In addition, a gap 210 is provided between the edge of a flange 212 on gate insert 188 and sidewall 208. Given the tapering, there is minimal float for the gate insert 188 traverse to the mold-clamping axis than in the embodiment described in FIG. 6. It is contemplated that clearance could be provided between tapered portions 202 and 24 should a greater degree of float be desired.

Figure 10:
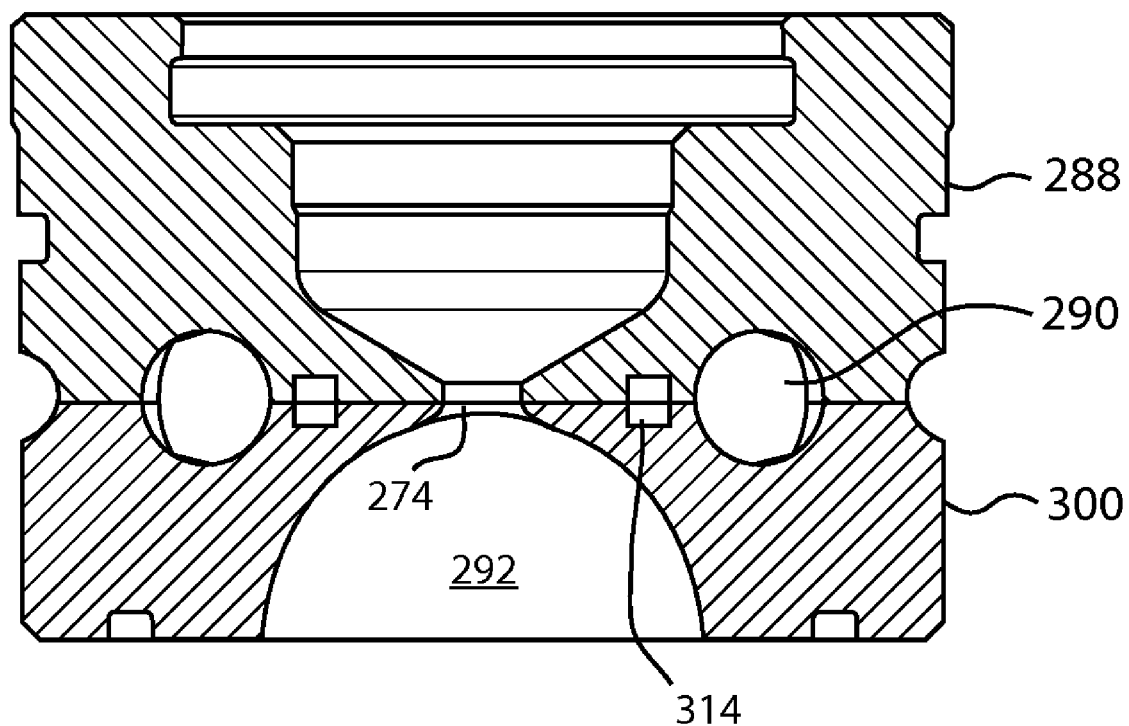
FIG. 10 shows a cross section view of a gate insert for the stationary portion shown in FIG. 2, in accordance with a third non-limiting embodiment of the invention.

Referring now to FIG. 10, a gate insert in accordance with a third non-limiting embodiment of the invention is shown at 288. A first portion of a gate 274 is defined by gate insert 288 and a second portion of gate 74 is defined by a first cavity insert 300 (which defines a portion of a cavity 292). Gate insert 288 and first cavity insert 300 float relative to one another on an axis generally traverse to the mold clamping axis, providing a sliding, or "floating" interface between the two halves of gate 274.

A cooling channel 290 is cooperatively defined between gate insert 288 and cavity insert 300 to reduce heat transference from nozzle assembly 54 to a cavity 192. A cooling fluid, such as water, is circulated through the cooling channels 190 during a cooling phase of an injection. By splitting the cooling channel 290 between gate insert 288 and cavity insert 300, the machining of the cooling channel 290 is simplified. Seal niches 314 are provided to locate rubberized seals and prevent leakage into cavity 292.

Figure 11:
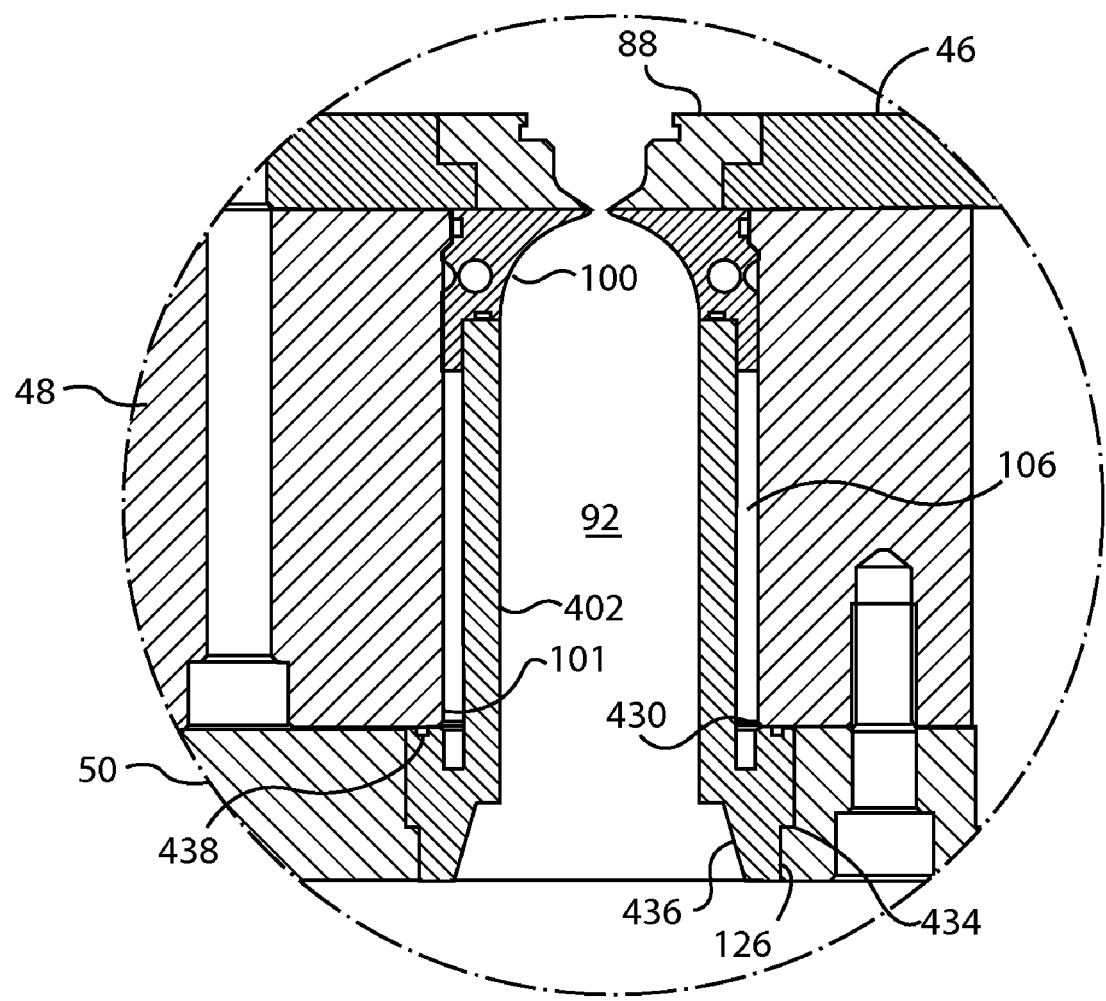
FIG. 11 shows a cross section view of a cavity insert plate for the stationary portion shown in FIG. 2, in accordance with a fourth non-limiting embodiment of the invention.

Referring now to FIG. 11, a second cavity insert having an integral taper is shown at 402. Second cavity insert 402 is retained at one end by a first cavity insert 100, as is described above, and is retained at the other end by taper insert plate 50. Each second cavity insert 402 includes a cavity plate land 430 which abuts against cavity plate 48, and a taper plate land 434 which abuts against taper insert plate 50, thereby retaining the second cavity insert 402 in a floating fit between taper insert plate 50 and first cavity insert 400. Second cavity insert 402 further includes a tapered surface 436 which helps locate a neck ring (not shown) during the insertion of the core member (also not shown) into the mold cavity 92 during the injection cycle. A seal niche 438 is provided to locate a rubberized seal and prevent leakage between second cavity insert 402 and cavity plate 48.

The operation of the present invention will now be described over the course of an injection cycle, with reference to FIGS. 2-3. In a typical injection cycle, valve stem 70 is retracted by piston 72 to open the gate 74. Molten resin, fed by hot runner system 52 to nozzle channel 68, and hence to nozzle tip 66, is conveyed under pressure to mold cavity 92 through gate 74. Throughout the cycle, nozzle heaters 76 to maintain resin in nozzle channel 68 at an optimum processing temperature. Once the mold is full, valve stem 70 is advanced to seat in gate 74 to stop the flow of resin. The cooling channels 104 and 106, and the cooling tube 122 circulate water to remove heat from the resin, causing it to freeze into the shape of the preform. The mold opens and the preform is ejected (not discussed). The mold then closes, and the cycle repeats.

After a number of cycles, an operator may wish to exchange the first cavity inserts 100 and second cavity inserts 102, typically in order to provide a different cavity shape. The operator will remove the taper insert plate 50. Taper inserts 128 can be exchanged, if needed. Although nozzle assemblies 54 remain dangerously hot, the operator will be able to slide the first cavity inserts 100 and second cavity inserts 102 out of cavity bore 101 since gate insert 88 fully covers the nozzle assembly.

Non-limiting embodiments of the present invention can decrease the amount of time required that operators must wait before exchanging cavity inserts as the nozzle assemblies remain covered by the gate inserts during the conversion. Non-limiting embodiments of the present invention can reduce cycle time due to cooling efficiency in the gate and taper inserts. In addition, non-limiting embodiments of the present invention can reduce the wear and tear on the gate and taper inserts due to the inserts being seated in a floating arrangement. Furthermore, non-limiting embodiments of the present invention can reduce the cost for prototype stacks as the gate and taper inserts are machined independently of the cavity inserts.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims.

What is claimed is:

1. A mold assembly for an injection molding machine having a stationary portion and a moving portion, and a nozzle assembly for conveying a fluid, comprising:
- a cavity plate associated with the stationary portion, the cavity plate housing a cavity insert for defining (i) a first portion of a mold cavity and (ii) a first portion of a gate for communicating the fluid;
- a core plate associated with the moving portion, the core plate housing a mold core, the mold core for defining a second portion of the mold cavity;
- a gate insert plate housing a gate insert for defining (i) a receptacle for the nozzle assembly and (ii) a second portion of the gate, the gate insert being floatably retained within the gate insert plate for allowing the gate insert to float relative to the cavity insert;
- whereby the gate insert and the cavity insert float relative to one another on an axis generally traverse to a mold clamping axis.

2. The mold assembly of claim 1, wherein the gate insert plate is operable to continually cover a portion of the nozzle assembly while the at least one cavity insert is removed from the stationary portion.

3. The mold assembly of claim 1, wherein both the gate insert plate and the nozzle assembly are mounted to a manifold plate on the stationary portion of the injection molding machine.

4. The mold assembly of claim 2, wherein the cavity insert includes a first cavity insert and a second cavity insert that are cooperatively aligned to define the mold cavity.

5. The mold assembly of claim 3, wherein at least one of the first cavity insert and the second cavity insert defines a cooling channel.

6. The mold assembly of claim 2, wherein the gate insert defines a cooling channel.

7. The mold assembly of claim 1, wherein the gate insert includes a tapered portion that is complementary to an adjacent tapered portion on the at least one cavity insert.

8. The mold assembly of claim 7, wherein a cooling channel is located at least partially within the tapered portion.

9. The mold assembly of claim 7, wherein an interface between the tapered portion on the gate insert and the adjacent tapered portion on the at least one cavity insert helps to align the first portion of the gate and the second portion of the gate.

10. The injection molding machine of claim 5, wherein a cooling channel is cooperatively defined between the gate insert and one of the at least one cavity insert.

* * * * *